United States Patent [19]

Collins et al.

[11] Patent Number: 4,555,612

[45] Date of Patent: Nov. 26, 1985

[54] PLASMA JET CLEANING APPARATUS AND METHOD

[75] Inventors: Michael F. Collins, Scotia; Francis D. Lordi, Rotterdam Junction, both of N.Y.

[73] Assignee: General Electric Co., Schenectady, N.Y.

[21] Appl. No.: 542,668

[22] Filed: Oct. 17, 1983

[51] Int. Cl.⁴ .............................................. B23K 9/00
[52] U.S. Cl. ........................ 219/121 P; 219/121 EA; 219/60 R; 219/130.32; 219/121 PY
[58] Field of Search ....... 219/121 PL, 121 P, 121 PT, 219/121 EA, 121 EW, 121 EK, 121 LA, 121 L, 76.16, 130.32, 130.33, 130.51, 137 PS, 137 R, 60 R, 60 A, 61, 61.12; 313/160; 118/50.1, 723

[56] References Cited

U.S. PATENT DOCUMENTS

| | | | |
|---|---|---|---|
| 3,050,616 | 9/1957 | Gage | 219/69 |
| 3,146,336 | 8/1964 | Whitacre | 219/121 P |
| 3,179,783 | 4/1965 | Johnson | 219/76 |
| 3,484,575 | 12/1969 | Cunningham | 219/74 |
| 3,588,441 | 6/1971 | Dobbs et al. | 219/121 P |
| 3,619,551 | 11/1971 | Dobbs et al. | 219/121 P |
| 3,621,179 | 11/1971 | Tyiko | 219/121 P |
| 3,904,846 | 9/1975 | Risberg | 219/130.33 |
| 3,999,034 | 12/1976 | Barhorst | 219/130.32 |
| 4,038,515 | 7/1977 | Risberg | 219/130.33 |
| 4,162,389 | 7/1979 | Shimdada et al. | 219/121 P |
| 4,328,257 | 5/1982 | Muehlberger et al. | 427/34 |
| 4,371,563 | 2/1983 | Muehlberger et al. | 427/34 |
| 4,434,348 | 2/1984 | Reid | 219/75 X |

*Primary Examiner*—C. L. Albritton
*Assistant Examiner*—M. M. Lateef
*Attorney, Agent, or Firm*—J. C. Squillaro

[57] ABSTRACT

Voltage in a transfer arc power supply of a plasma jet cleaning apparatus employed to induce a cathode workpiece current for cleaning a surface of the workpiece includes apparatus for cyclically varying the applied voltage between at least two negative levels which are effective to induce two levels of workpiece current. The more negative voltage is effective to produce a large workpiece current and to clean dielectric impurities from the surface of the workpiece. The less negative voltage is effective to maintain current flow but to permit enhanced motion of the plasma jet over the workpiece surface so that any tendency for sticking of cathode spots on the workpiece during existence of the more negative voltage is counteracted.

16 Claims, 2 Drawing Figures

PLASMA JET CLEANING APPARATUS AND METHOD

BACKGROUND OF THE INVENTION

The present invention relates to plasma jet apparatus and, more particularly, to plasma jet apparatus effective for cleaning contaminants from a conductive substrate.

Plasma jet devices have been used for applying coatings to conductive substrates. In such plasma jet devices, an arc is sustained across a stream of inert gas such as, for example, a mixture of helium and argon. The arc ionizes and heats the inert gas to produce a flow of ionized gas or plasma which is typically directed through an aperture toward a conductive workpiece. U.S. Pat. No. 3,179,783 discloses such a plasma jet device in which a powder to be coated on the surface of a workpiece is injected into the plasma jet. The workpiece is maintained at a positive potential with respect to the forward electrode of the plasma jet device to form a transfer arc therebetween which urges the ionized plasma jet, and the entrained powder, to impact the substrate at high velocity. The substrate is heated by the impinging hot plasma aided by the transfer arc. The powder is heated and melted by its residence in the hot plasma and the molten particles are impacted at high velocity onto the heated subtrate to form a coating thereon.

This patent also discloses the application of high voltage pulses to the workpiece in order to periodically create an energetic spark discharge for hardening the surface of the substrate which, in the example disclosed, is a mild steel capable of being work hardened by such treatment. There is also disclosure in this patent of using reversed polarities on either of the two power supplies therein and also of using AC or compounded AC and DC without any disclosure of the parameters or effects thereof.

U.S. Pat. No. 4,162,389 discloses the use of a cathode target for improving the smoothness and reducing the penetration of a weld bead. This patent makes no mention of cleaning.

U.S. Pat. No. 4,328,257 to Muehlberger et al, the disclosure of which is herein incorporated by reference, discloses a system and method for plasma coating a protective material on a superalloy substrate such as used, for example, in blades or buckets of gas turbines. The plasma coating operation, in which the applied voltages produce an anodic workpiece, is preceded by a cleaning operation in which the applied voltages produce a cathodic workpiece. During the cleaning operation, cathode spots at the ends of small arcs travel across the surface of the workpiece. The motion of the cathode spots is produced by the electric and magnetic fields generated by the arcs themselves aided by complex motion of the plasma gun and the workpiece to preferentially remove contaminants from the surface of such alloys.

Although we do not intend to be limited by a particular theory of operation of our apparatus and method, we believe that surface cleaning with a cathodic workpiece relies on the fact that the surface contaminants on superalloys such as, for example, on International Nickel alloy IN738, and particularly the oxides of such superalloys, are thin insulating layers having substantial dielectric constants. We believe that, when an electric field of sufficient magnitude is applied across such thin insulating layers, a dielectric stress is produced in the surface contaminants which is sufficient to initiate a discharge current by field emission. A large number of arcs terminating in cathode spots on the negatively charged workpiece are observed. In therory, at least, motion of the cathode spots self-induced by the electric and magnetic fields, aided by the relative motion of plasma gun and workpiece, should be sufficient to keep the arcs and their associated cathode spots moving at high enough speed over the surface of the workpiece that, although the contaminant layer is removed and the underlying metallic substrate of the workpiece is cleaned, the motion is rapid enough and continuous enough to prevent overheating and consequent damage to the subtrate.

We have observed that the arcs used for cleaning with the Muehlberger et al apparatus and process occasionally stick, or remain in one location, an excessive amount of time and thereby produce localized melting and overheating of the substrate. This can lead to pitting and loss of material as well as damagingly high temperatures, particularly in the vicinity of thin sections such as a bucket trailing edge or tip. If arc damage is suspected during the cleaning process, the workpiece must be manually examined for excessive loss of material and/or cracking. If such damage has occurred, there may be no alternative to scrapping of the bucket. Since buckets of superalloy metals are expensive objects, and since the cleaning operation takes place almost at the end of the manufacturing cycle when a bucket represents a substantial investment in labor as well as material, means for reducing or eliminating the scrap rate at this late stage in the manufacturing process is welcome.

OBJECTS AND SUMMARY OF THE INVENTION

Accordingly, it is an object of the invention to provide method and apparatus for cleaning a substrate with a plasma arc device which overcomes the drawbacks of the prior art.

It is a further object of the invention to provide method and apparatus for cleaning a substrate wherein a cathodic workpiece current is varied between a maximum and a minimum value whereby mobility of cathode spots on the workpiece is enhanced.

According to an embodiment of the invention, there is provided apparatus for plasma jet cleaning of a workpiece comprising means for producing a plasma jet impingable on a workpiece, means for producing a negative voltage on the workpiece effective for maintaining a cathode current between the workpiece and the means for producing a plasma jet, and means for cyclically varying the cathode current at a repetition frequency between a first current value which is effective to perform plasma jet cleaning of the workpiece and a second, lower, current value which is effective to enhance movement of the cathode spots over a surface of the workpiece whereby improved cleaning with reduced probability of workpiece surface damage is attained.

According to a feature of the invention, there is provided a method for plasma jet cleaning of a workpiece comprising producing a plasma jet impingable on a workpiece, producing a negative voltage on the workpiece effective for maintaining a cathode current in the workpiece, and cyclically varying the cathode current at a repetition frequency between a first current value which is effective to perform plasma jet cleaning of the workpiece and a second, lower, current value which is effective to enhance movement of the cathode spots over a surface of the workpiece whereby improved cleaning with reduced probability of workpiece surface damage is attained.

Briefly stated, the present invention provides apparatus and method wherein voltage in a transfer arc power supply of a plasma jet cleaning apparatus is employed to induce a cathodic workpiece current for cleaning a surface of the workpiece. The invention includes method and apparatus for cyclically varying the applied voltage between at least two negative levels which are effective to induce two levels of workpiece current. The more negative voltage is effective to produce a large workpiece current and to clean dielectric impurities from the surface of the workpiece. The less negative voltage is effective to maintain a current which is small enough to permit enhanced motion of the plasma jet over the workpiece surface so that any tendency for sticking of cathode spots on the workpiece during existence of the more negative voltage and higher current is counteracted.

The above, and other objects, features and advantages of the present invention will become apparent from the following description read in conjunction with the accompanying drawings, in which like reference numerals designate the same elements.

DETAILED DESCRIPTION OF THE PREFERRED EMBODIMENT

Plasma arc coating apparatus including reversed polarity cleaning such as, for example, the apparatus disclosed in the Muehlberger et al patent supra, are known in the art and are commercially available from, for example, Electro-Plasma, Inc. of Irvine, California. The internal structure and normal operation of such apparatus need not be detailed herein to enable one skilled in the art to practice the present invention. Thus, the description herein is limited to that which is necessary to an understanding of the present invention and extraneous description of the remaining elements which are well known in the art is omitted.

Figure 1:
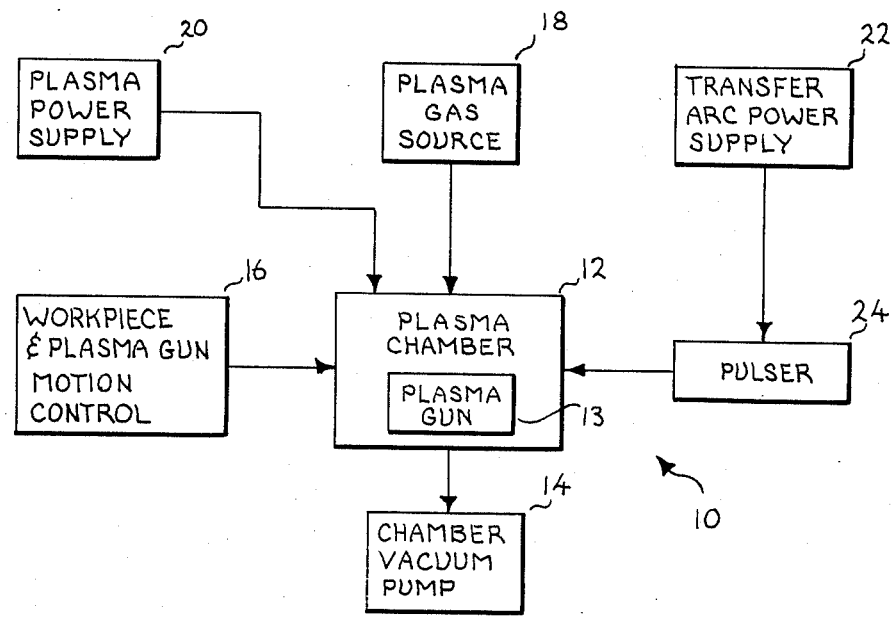
FIG. 1 is a simplified block diagram of a plasma cleaning apparatus according to an embodiment of the invention.

Referring now to FIG. 1, there is shown, generally at 10, a plasma jet cleaning apparatus according to the present invention. Although not detailed in the figure nor described herein, plasma jet cleaning apparatus 10 may also be part of a plasma coating or welding apparatus which is adapted to perform such an operation subsequent to the cleaning of the workpiece. A plasma chamber 12 conventionally comprises a sealable chamber whose internal pressure may be controlled by operation of a chamber vacuum pump 14. Plasma chamber 12 is adapted to contain a plasma gun 13 and a workpiece to be cleaned (not shown). A workpiece and plasma gun motion control 16 is conventionally effective to produce complex motion of plasma gun 13 and the workpiece both in translation and in rotation about one or more axes in order to present a continuously changing aspect between plasma gun 13 and the workpiece for encouraging the rapid travel of cathode spots during cleaning and for attaining even coverage during coating.

Plasma gun 13 receives a supply of an inert gas such as, for example, a mixture of helium and argon, from a plasma gas source 18. An electrical discharge is maintained through the plasma gas flowing through plasma gun 13 using DC power from a plasma power supply 20. The electrical discharge ionizes the inert gas to produce a plasma jet. A conventional transfer arc power supply 22 normally applies a positive DC voltage to the workpiece in plasma chamber 12 during coating and a negative DC voltage to the workpiece during cleaning. In order to improve the cleaning and to substantially reduce sticking of the cleaning arcs for an excessive time, the present invention adds a pulser 24 which is effective to periodically vary the negative DC voltage applied to the workpiece between at least two levels so that a variation in the workpiece current is attained.

Figure 2:
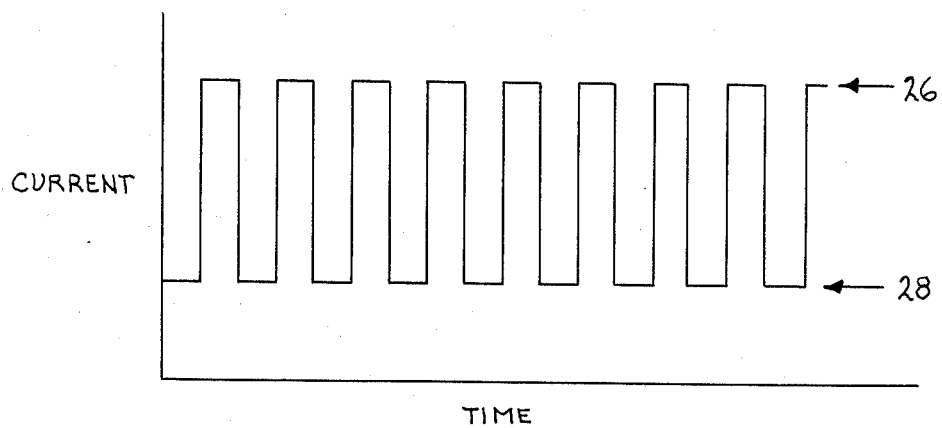
FIG. 2 is a plot of workpiece current versus time for the plasma cleaning apparatus of FIG. 1.

Referring now to FIG. 2, there is shown a graph of the workpiece current for one embodiment of the invention. Pulser 24 value 28 effectively varies the voltage applied between the workpiece and plasma gun 13 to produce a variation in workpiece current between a maximum current value 26 and a minimum current value 28. Maximum current value 26 may be about the same as the current produced by a DC transfer arc power supply of the prior art. Minimum current value 28 is selected to be a value which is low enough to encourage motion of the cathode spots on the workpiece for the prevention of sticking. If voltage reversal or periods of zero voltage resulting in the termination of current were permitted between maximum current periods, problems with reinitiating current are likely to be encountered. It is therefore to be noted that, although minimum current value 28 has a lower value than maximum current value 26, current is maintained through the plasma at all times so that problems with arc initiation after a period of zero current are avoided.

The controllable parameters which govern the quality of cleaning performed and the avoidance of injury to the workpiece due to arc sticking include the following:
1. maximum current value
2. minimum current value
3. duty ratio of maximum to minimum current value
4. frequency of pulsations between maximum and minimum current values
5. pressure within plasma chamber
6. distance of plasma gun from workpiece
7. motion of plasma gun and workpiece during cleaning.

In normal operation, even with unpulsed DC cleaning, arc melting, although a significant problem with substantial economic consequences when it occurs, is a relatively infrequent event. For test purposes, it is convenient to coat a workpiece with a dielectric coating of a type which simulates the normal surface contaminants but which guarantees a large number of arc spots and also a large amount of arc melting with unpulsed DC cleaning. A coating of MgO is suitable for this purpose and is additionally useful since it is a material which may be coated on a surface of the workpiece as part of a crack inspection procedure and may not be completely removed before the plasma arc cleaning process is performed. With such a coating and an unpulsed DC workpiece current of about 140 amperes, from about 5 to about 50 arc melts per square inch were produced. From about 15 to about 20 cathode spots were observed on the workpiece. In addition, the travel speed of the cathode spots on the workpiece was about 1500 inches per second on relatively clean target areas whereas their travel speed slowed to from about 750 to about 1000 inches per second on the coated areas.

Using pulsed DC (FIG. 2) with a maximum current value 26 of 140 amperes and a minimum current value 28 of about 25 percent of maximum current value 26, with a duty ratio (ratio of maximum current value 26 to minimum current value 28) of 50 percent, the number of cathode spots on the workpiece increased by about 25 percent and the travel speed of the arc spots increased to between about 2000 and 4000 inches per second independently of the surface condition of the workpiece. Cleaning was improved even though the power input was decreased. It appeared that the reduced current during minimum current value 28 permitted detachment of any incipient sticking tendency and contributed to cathode spot mobility. Since the tendency for arcing is reduced in the absence of a dielectric layer to initiate it through field emission, increasing the number and mobility of the cathode spots improves the cleaning capability while virtually eliminating arc sticking and consequent workpiece damage. Workpiece damage is further reduced by the reduction in average power input to the workpiece. The reduction in average power to a turbine bucket was found to reduce the average temperature attained during cleaning in the critical thin sections in the tip and trailing edge regions by as much as about 30 degrees F.

Best results were obtained in one embodiment of the invention with a pressure in plasma chamber 12 of from about 30 to about 40 torr.

When the duty ratio of the pulsed DC waveform is increased beyond about 85 percent, there does not appear to be enough time for the cathode spots to detach themselves during minimum current value 28 before the onset of the next maximum current value 26. This condition produces sticking and resultant damage substantially equivalent to that experienced with unpulsed DC cleaning previously described. When the duty ratio is decreased below about 15 percent, a smaller number of more pronounced arcs and inferior cleaning results. At small duty ratios, there does not appear to be enough time at maximum current value 26 to properly clean the workpiece. Thus, a feasible range of operation appears to include a duty ratio of from about 15 to about 85 percent with the optimum duty ratio in the neighborhood of 50 percent.

A range of pulse repetition frequencies for the pulsed DC waveform of FIG. 2 of from about 5 to about 60 pulses per second is effective for producing with reasonable mobility of the cathode spots. A pulse repetition frequency of about 10 pulses per second provided the best cleaning in the particular test application.

When applied to other workpieces and/or plasma jet cleaning operations, changes may be necessary in chamber pressure, workpiece current, maximum current value 26, the ratio of maximum current value 26 to minimum current value 28, duty ratio, pulse repetition frequency, gun-to-target distance or in other operating conditions from those employed in the above description. However, one skilled in the art, with the present disclosure before him would be capable of determining such changed parameters through the exercise of routine engineering practice without the need for undue experimentation.

The square waveform of FIG. 2 should not be considered as limiting the invention since other waveforms may also be suitable. In some applications, for example, trapezoidal, sinusoidal, sawtooth or other suitable waveforms which are effective to maintain workpiece current flow while varying the workpiece current sufficiently to enhance cathode spot mobility and reduce sticking, may provide improved cleaning with reduced workpiece damage.

We have observed that the path followed by cathode spots employing pulsed DC according to the present invention is more sensitive to the geometry of the workpiece than is the path followed by the cathode spots using unpulsed DC. That is, the plasma jet follows a substantially different path over a concave portion of the workpiece than it does over a convex portion. For certain workpiece geometries, it may be preferred to more closely control the path of the cathode spots over certain portions of the workpiece by using unpulsed DC while enhancing cleaning and reducing the possibility of damage by using pulsed DC over the remainder. In order to accomplish this type of control, pulser 24 may be selectively turned on and off so that, when it is off, unpulsed DC is provided and, when it is on, pulsed DC is employed.

Having described preferred embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims.

What we claim is:

1. Apparatus for plasma jet cleaning of a workpiece comprising:
   means for producing a plasma jet impingable on a workpiece;
   means for producing a negative voltage on said workpiece effective for maintaining a cathode current between said workpiece and said means for producing a plasma jet; and
   means for cyclically varying said cathode current at a repetition frequency between a first current value which is effective to perform plasma jet cleaning of said workpiece and a second, lower, current value in the same direction as said first current value, without an intervening current value of zero which is effective to enhance movement of said plasma jet over a surface of said workpiece whereby improved cleaning with reduced probability of workpiece surface damage is attained.

2. Apparatus according to claim 1 wherein a duty ratio of said first to said second current value is from about 15 to about 85 percent.

3. Apparatus according to claim 2 wherein said duty ratio is about 50 percent.

4. Apparatus according to claim 1 wherein said repetition frequency is from about 5 to about 60 cycles per second.

5. Apparatus according to claim 4 wherein said repetition frequency is about 10 cycles per second.

6. Apparatus according to claim 1 wherein said repetition frequency is effective to enhance movement of said plasma jet over a surface of said workpiece.

7. Apparatus according to claim 1 wherein a waveform of said first and second current values is a pulsed DC waveform.

8. Apparatus according to claim 1 wherein said means for cyclically varying includes means for applying said first current value for cleaning selected areas of said workpiece whereby positional controllability of said plasma jet in said selected areas is improved.

9. A method for plasma jet cleaning of a workpiece comprising:

producing a plasma jet impingable on a workpiece;

producing a negative voltage on said workpiece effective for maintaining a cathode current in said workpiece; and cyclically varying said cathode current at a repetition frequency between a first current value which is effective to perform plasma jet cleaning of said workpiece and a second, lower, current value in the same direction as said first current value, without an intervening current value of zero which is effective to enhance movement of said plasma jet over a surface of said workpiece whereby improved cleaning with reduced probability of workpiece surface damage is attained.

10. A method according to claim 9 wherein the step of cyclically varying includes maintaining a duty ratio of said first to said second current value of from about 15 to about 85 percent.

11. A method according to claim 10 wherein the step of maintaining said duty ratio includes maintaining said duty ratio at about 50 percent.

12. A method according to claim 9 wherein said the step of cyclically varying includes cyclically varying at a repetition frequency of from about 5 to about 60 cycles per second.

13. A method according to claim 12 wherein said repetition frequency is about 10 cycles per second.

14. A method according to claim 9 wherein the step of cyclically varying includes cyclically varying at a repetition frequency having a value effective to enhance movement of said plasma jet over a surface of said workpiece.

15. A method according to claim 9 wherein the step of cyclically varying includes producing a waveform of said first and second current values which is a pulsed substantially DC waveform.

16. A method according to claim 9 wherein the step of cyclically varying includes applying said first current value for cleaning selected areas of said workpiece whereby positional controllability of said plasma jet in said selected areas is improved.

* * * * *